US009798314B2

(12) United States Patent
Dougherty et al.

(10) Patent No.: US 9,798,314 B2
(45) Date of Patent: Oct. 24, 2017

(54) INTELLIGENT MOBILE DEVICE TEST FIXTURE

(71) Applicant: FMR LLC, Boston, MA (US)

(72) Inventors: Thomas Eugene Dougherty, Merrimack, NH (US); Hongyu Wang, Liaoning (CN); Hongbing Gu, Liaoning (CN); Bahram Omidfar, Summit, WI (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/242,016

(22) Filed: Aug. 19, 2016

(65) Prior Publication Data

US 2017/0052527 A1    Feb. 23, 2017

Related U.S. Application Data

(60) Provisional application No. 62/207,304, filed on Aug. 19, 2015.

(51) Int. Cl.
*G06F 9/44* (2006.01)
*G05B 19/402* (2006.01)

(52) U.S. Cl.
CPC .. *G05B 19/402* (2013.01); *G05B 2219/34221* (2013.01)

(58) Field of Classification Search
CPC ........... G06F 11/3672; B25J 9/00–9/20; G05B 19/402
USPC ........................................................ 717/124
See application file for complete search history.

(56) References Cited

U.S. PATENT DOCUMENTS

| 6,008,636 A * | 12/1999 | Miller ..................... G01R 31/01 |
| | | 324/757.01 |
| 8,061,223 B2 * | 11/2011 | Pan ......................... G06F 3/041 |
| | | 73/865.3 |
| 8,358,787 B2 | 1/2013 | Lee et al. |
| 8,909,498 B2 | 12/2014 | Kennedy et al. |
| 8,971,821 B2 * | 3/2015 | Schlub ............... G01R 29/0857 |
| | | 455/423 |

(Continued)

OTHER PUBLICATIONS

Stephanie Milot, "T-Mobile Software-Testing Robot Gets Tap-Happy," PCMag.com, published Sep. 13, 2012, 2 pages, 8retrieved from http://www.pcmag.com/article2/0,2817,2409695,00.asp.

*Primary Examiner* — Francisco Aponte
(74) *Attorney, Agent, or Firm* — Proskauer Rose LLP

(57) ABSTRACT

Described are methods and apparatuses, including computer program products, for testing mobile devices using an intelligent mobile device test fixture. A server computing device generates programmatic instructions for testing an application on a mobile device coupled to the test fixture, where the programmatic instructions are based upon a test script, and include a first set of instructions and a second set of instructions. The server computing device transmits the first set of instructions to the application, and transmits the second set of instructions to a controller board coupled to the test fixture. The application executes the first set of instructions to activate functionality. The controller board executes the second set of instructions to activate one or more servo motors of the test fixture that control movement of the fixture. The server computing device determines an updated state of the application after execution of each instruction.

25 Claims, 7 Drawing Sheets

(56) References Cited

U.S. PATENT DOCUMENTS

| | | | | |
|---|---|---|---|---|
| 8,996,166 B2* | 3/2015 | Jenkinson | G06F 3/0418 | 345/174 |
| 9,003,892 B2* | 4/2015 | Hou | G01N 19/00 | 345/173 |
| 9,075,781 B2* | 7/2015 | Matthews | G06F 11/2294 | |
| 9,283,672 B1* | 3/2016 | Matthews | G01M 99/008 | |
| 9,298,312 B2* | 3/2016 | Kuznetsov | G06F 3/0418 | |
| 9,317,147 B2* | 4/2016 | Welch | H04N 17/00 | |
| 9,367,436 B2* | 6/2016 | Matthews | G06F 11/2294 | |
| 9,469,037 B2* | 10/2016 | Matthews | G01M 99/008 | |
| 9,481,084 B2* | 11/2016 | Park | B25J 9/1612 | |
| 9,578,133 B2* | 2/2017 | Matthews | H04L 67/34 | |
| 9,710,105 B2* | 7/2017 | Uzelac | G06F 3/0418 | |
| 2007/0061096 A1 | 3/2007 | Mok | | |
| 2009/0312009 A1* | 12/2009 | Fishel | H01Q 1/241 | 455/425 |
| 2010/0198402 A1* | 8/2010 | Greer | A61B 19/201 | 700/247 |
| 2011/0288964 A1* | 11/2011 | Linder | B25J 9/1689 | 705/27.1 |
| 2012/0266021 A1* | 10/2012 | Tian | G06F 11/2733 | 714/27 |
| 2012/0280934 A1* | 11/2012 | Ha | G06F 11/2221 | 345/174 |
| 2012/0311569 A1* | 12/2012 | Shah | G06F 9/45533 | 718/1 |
| 2013/0197862 A1* | 8/2013 | Uzelac | G06F 3/0418 | 702/186 |
| 2013/0200917 A1* | 8/2013 | Panagas | G01R 1/0441 | 324/757.01 |
| 2014/0152584 A1* | 6/2014 | Matthews | G06F 11/3041 | 345/173 |
| 2014/0281714 A1* | 9/2014 | Matthews | G06F 11/2294 | 714/27 |
| 2014/0340680 A1 | 11/2014 | Montminy et al. | | |
| 2015/0044653 A1* | 2/2015 | Levine | G09B 23/288 | 434/262 |
| 2015/0126129 A1* | 5/2015 | Rangappagowda | H04W 24/06 | 455/67.11 |
| 2015/0156299 A1* | 6/2015 | Abramo | H04L 67/12 | 455/41.2 |
| 2016/0098688 A1* | 4/2016 | Hunt | G06Q 20/18 | 705/308 |

* cited by examiner

INTELLIGENT MOBILE DEVICE TEST FIXTURE

RELATED APPLICATIONS

This application claims priority to U.S. Provisional Patent Application No. 62/207,304, filed Aug. 19, 2015, the entirety of which is incorporated herein by reference.

TECHNICAL FIELD

The subject matter of this application relates generally to methods and apparatuses, including computer program products, for an intelligent mobile device test fixture.

BACKGROUND

Mobile computing devices, such as smartphones and tablets, have become an integral part of many people's daily lives. These devices typically take advantage of a range of biometric and physical input provided by a user, including but not limited to finger taps and gestures, fingerprint scanning, voice commands, device rotation and shaking, capturing images and scanning physical objects and/or environment with an embedded camera (e.g., check/document scanning), and so forth.

As a result, it is difficult to automate the process of mobile device testing with respect to such a wide range of input methods. Generally, currently-available automation software is not well-equipped to replicate human interactions with a device for testing purposes—especially when biometric or physical input must be tested. Instead, human testers must operate each device manually which is time-consuming and can lead to delays getting software updates to market.

SUMMARY

Therefore, what is needed is an intelligent mobile device test fixture to automate many types of biometric and physical input for the purpose of testing mobile devices. The methods and systems described herein provide an advantage of decreasing reliance on human testers, which leads to faster and more efficient testing of mobile devices.

The invention, in one aspect, features a computerized method for testing mobile devices using an intelligent mobile device test fixture. A server computing device generates programmatic instructions for testing an application on a mobile device coupled to an intelligent mobile device test fixture, where the programmatic instructions are based upon a test script and include a first set of instructions for performing functionality of the application and a second set of instructions for controlling the intelligent mobile device test fixture. The server computing device transmits the first set of instructions to the application on the mobile device and transmits the second set of instructions to a controller board coupled to the intelligent mobile device test fixture. The application executes the first set of instructions to activate functionality in the application. The controller board executes the second set of instructions to activate one or more servo motors of the intelligent mobile device test fixture that control movement of the fixture. The server computing device determines an updated state of the application after execution of each instruction in the first set of instructions and the second set of instructions.

The invention, in another aspect, features a system for testing mobile devices using an intelligent mobile device test fixture. The system includes a server computing device coupled to the intelligent mobile device test fixture. The server computing device is configured to generate programmatic instructions for testing an application on a mobile device coupled to an intelligent mobile device test fixture, where the programmatic instructions are based upon a test script and include a first set of instructions for performing functionality of the application and a second set of instructions for controlling the intelligent mobile device test fixture. The server computing device is configured to transmit the first set of instructions to the application on the mobile device and transmit the second set of instructions to a controller board coupled to the intelligent mobile device test fixture. The application is configured to execute the first set of instructions to activate functionality in the application. The controller board is configured to execute the second set of instructions to activate one or more servo motors of the intelligent mobile device test fixture that control movement of the fixture. The server computing device is configured to determine an updated state of the application after execution of each instruction in the first set of instructions and the second set of instructions.

The invention, in another aspect, features a computer program product, tangibly embodied in a non-transitory computer readable storage medium, for testing mobile devices using an intelligent mobile device test fixture. The computer program product includes instructions operable to cause a server computing device coupled to the intelligent mobile device test fixture to generate programmatic instructions for testing an application on a mobile device coupled to an intelligent mobile device test fixture, where the programmatic instructions are based upon a test script and include a first set of instructions for performing functionality of the application and a second set of instructions for controlling the intelligent mobile device test fixture. The computer program product includes instructions operable to cause the server computing device to transmit the first set of instructions to the application on the mobile device and transmit the second set of instructions to a controller board coupled to the intelligent mobile device test fixture. The application is configured to execute the first set of instructions to activate functionality in the application. The controller board is configured to execute the second set of instructions to activate one or more servo motors of the intelligent mobile device test fixture that control movement of the fixture. The server computing device is configured to determine an updated state of the application after execution of each instruction in the first set of instructions and the second set of instructions.

Any of the above aspects can include one or more of the following features. In some embodiments, the execution of the first set of instructions by the application is synchronized with the execution of the second set of instructions by the controller board. In some embodiments, the intelligent mobile device fixture comprises a platform with two expanding tracks arranged perpendicular to each other and connected at the center of the platform, wherein each expanding track includes two arms that move in opposite directions along the track. In some embodiments, each arm includes a tab at the end of the arm, the tab being used to secure the mobile device. In some embodiments, the one or more servo motors operate to rotate the platform of the intelligent mobile device fixture. In some embodiments, one or more linear actuators are coupled to the platform, the actuators operable to slide the platform laterally in either direction.

In some embodiments, the intelligent mobile test fixture comprises an audio playback apparatus including a speaker. In some embodiments, the second set of instructions includes an instruction that, when executed by the controller board, activates playback of an audio file on the speaker of the audio playback apparatus. In some embodiments, the first set of instructions includes an instruction that, when executed by the application, activates a microphone of the mobile device to capture the playback of the audio file from the speaker.

In some embodiments, the intelligent mobile test fixture comprises a display screen. In some embodiments, the second set of instructions includes an instruction that, when executed by the controller board, activates display of a digital image on the display screen. In some embodiments, the first set of instructions includes an instruction that, when executed by the application, activates an image capture apparatus of the mobile device to capture an image of the display screen.

In some embodiments, the server computing device translates the test script into the programmatic instructions. In some embodiments, the first set of instructions is written in a first programming language and the second set of instructions is written in a second programming language.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
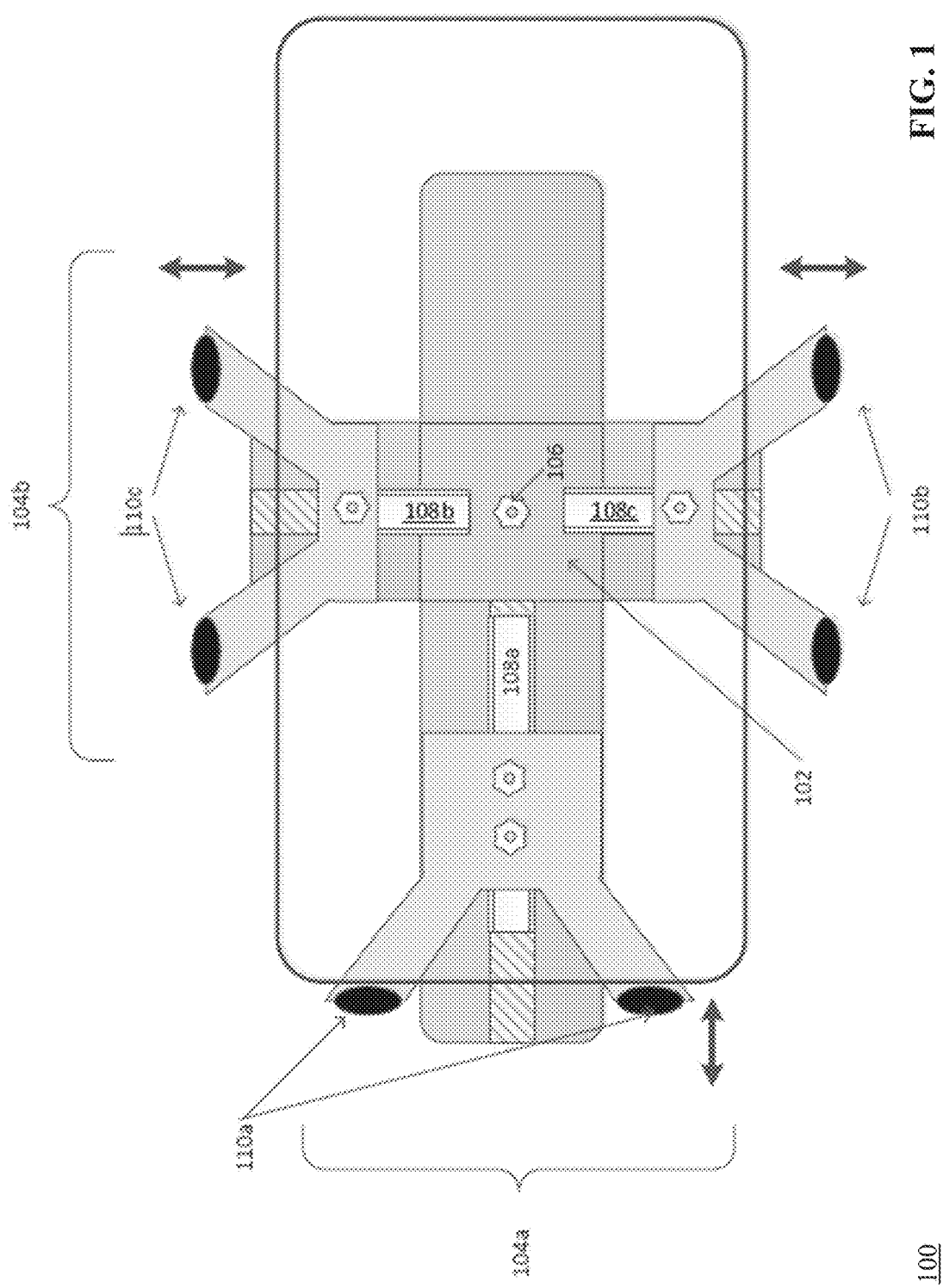
FIG. 1 is a top-down view of an intelligent mobile device test fixture.

FIG. 1 is a top-down view of an intelligent mobile device test fixture 100. As shown in FIG. 1, the intelligent mobile device test fixture includes a platform 102 with two expanding tracks 104a, 104b arranged perpendicular to each other and connected at the center (e.g., via bolt 106). Each expanding track includes two arms (e.g., arms 108a for track 104a and arms 108b, 108c for track 104b) that move along the respective track. Each arm includes a tab (e.g., tabs 110a-110c) at the end of the arm used to secure a mobile device. In a preferred embodiment, the tabs 110a-110c are comprised of a rubber material to secure the mobile device while also not damaging it.

The arms can move along their respective tracks in order to accommodate mobile devices of varying sizes and dimensions. For example, the arms can move closer to the center of the platform, thereby decreasing the distance between the tabs to fit smaller devices. The arms can also move further from the center of the platform, thereby increasing the distance between the tabs to fit larger devices. In some embodiments, the arms can move in concert with each other. In some embodiments, the arms can move independently of each other.

Figure 2:
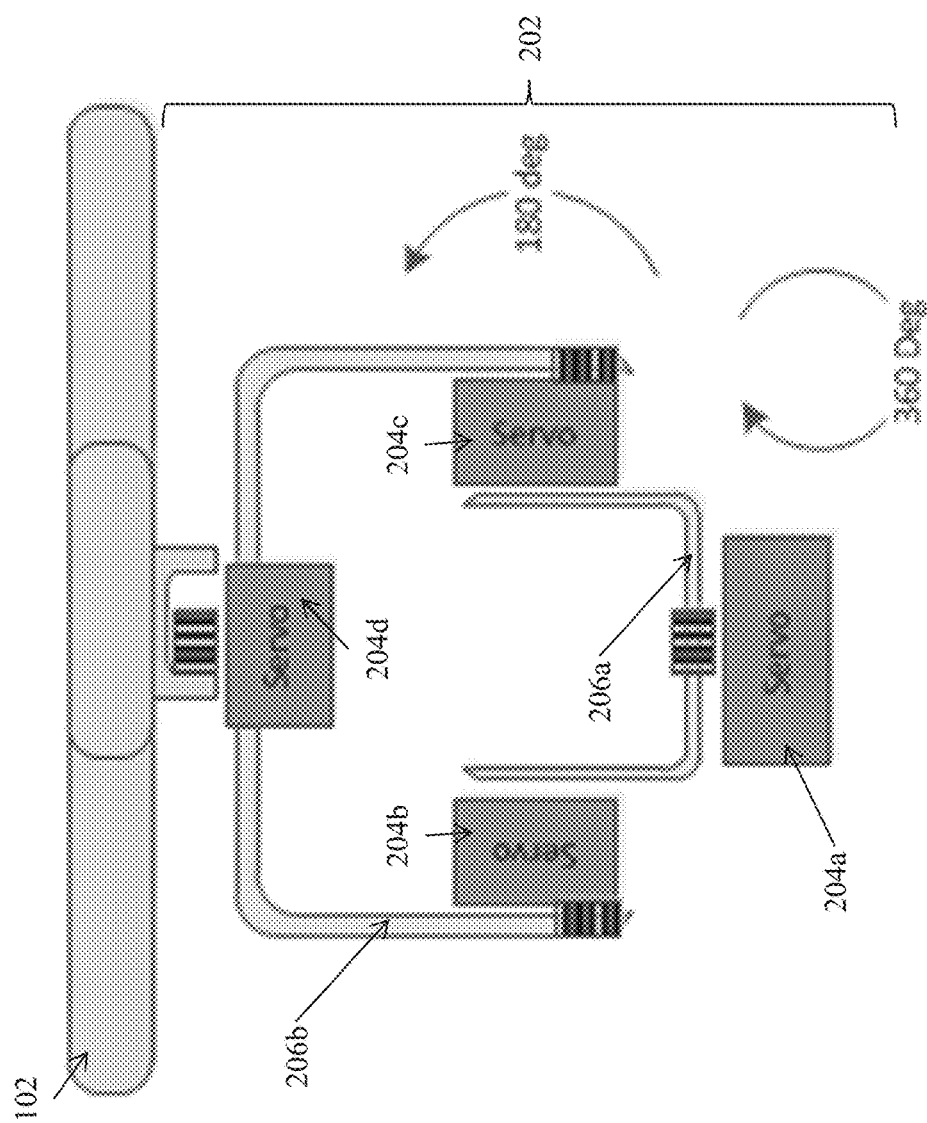
FIG. 2 is a side view of an intelligent mobile device test fixture.

FIG. 2 is a side view of the intelligent mobile device test fixture 100 of FIG. 1. As shown in FIG. 2, the platform 102 as described above with respect to FIG. 1 is at the top of the fixture 100. A servo assembly 202 is connected to the underside of the platform 102. The servo assembly 202 also includes several servo motors 204a-204d connected to each other via frames 206a-206b. The frames can be composed of metal and be coupled to the servo motors 204a-204d using any type of suitable fastener.

The servo motors 204a-204d are operable to rotate the platform 102 (and mobile device contained within) along three different axes (e.g., X, Y, and Z) to position the mobile phone in different orientations for the purpose of device testing. For example, servo motor 204a can rotate the bottom frame (206a) within a 360° range of motion, causing the platform 102 and mobile device to similarly rotate. In an embodiment, the bottom frame 206a rotates only within a 180° range of motion so as to avoid twisting of support harnesses (e.g., power cabling) that connect the servo motors 204a-204d to their respective controllers. In another example, servo motors 204b and 204c can rotate the top frame 206b within a 180° range of motion (i.e., in an arc from the left side to the top to the right side of the servo assembly 202) the platform 102 and mobile device to similarly rotate. In addition, servo motor 204d is operable to move the platform 102 in a 90° range of motion (i.e., between a parallel plane and a perpendicular plane) with respect to the servo assembly, enabling the mobile device to move between a flat, lying down position and an upright position.

Figure 3:
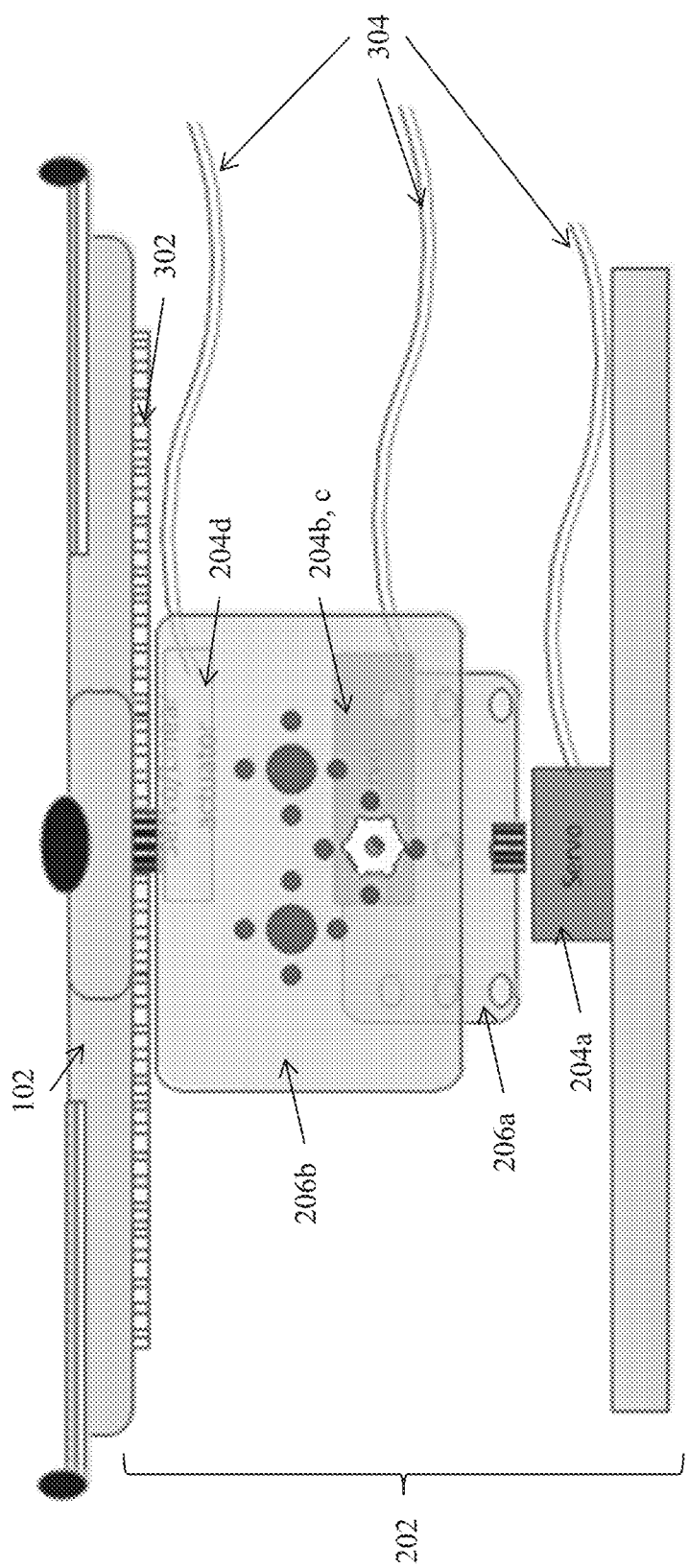
FIG. 3 is another side view of an intelligent mobile device test fixture.

FIG. 3 is another side view of the intelligent mobile device test fixture 100 of FIG. 1. As shown in FIG. 3, the platform 102 as described above with respect to FIG. 1 is at the top of the fixture 100. The frames 206a-206b are connected to the servo motors 204a-204d. Each servo motor 204a-204d includes a support harness 304 that comprises power cabling, control wiring, and the like that connects the servo motor to a corresponding controller board (not shown). Also, the fixture 100 in FIG. 3 includes a linear actuator 302 attached to the platform 102. The linear actuator 302 is operable to slide the platform 102 holding the mobile device laterally in either direction. For example, the linear actuator 302 can move the platform 102, e.g., two inches in either direction to enable a wider variety of positions and orientations for the mobile device when operated in conjunction with the servo assembly 202.

In some embodiments, the intelligent mobile device test fixture 100 includes one or more alignment sensors that can be embedded in the platform 102 in order to enable automated positioning and alignment of the test fixture. For example, an alignment sensor can be positioned at either end, or at both ends, of the platform 102. The alignment sensor(s) can be coupled to the controller board in order to send a signal to the controller board regarding positioning and alignment of the platform 102. The apparatus can also include additional proximity sensors embedded in other components of the apparatus (e.g., the stations 506a, 506b of FIG. 5 as described below) that communicate with the proximity sensors embedded in the platform to verify that the platform 102 is in proper alignment with the stations 506a, 506b to allow the mobile device to capture images, audio, and other information accurately from the stations 506a, 506b.

Figure 4:
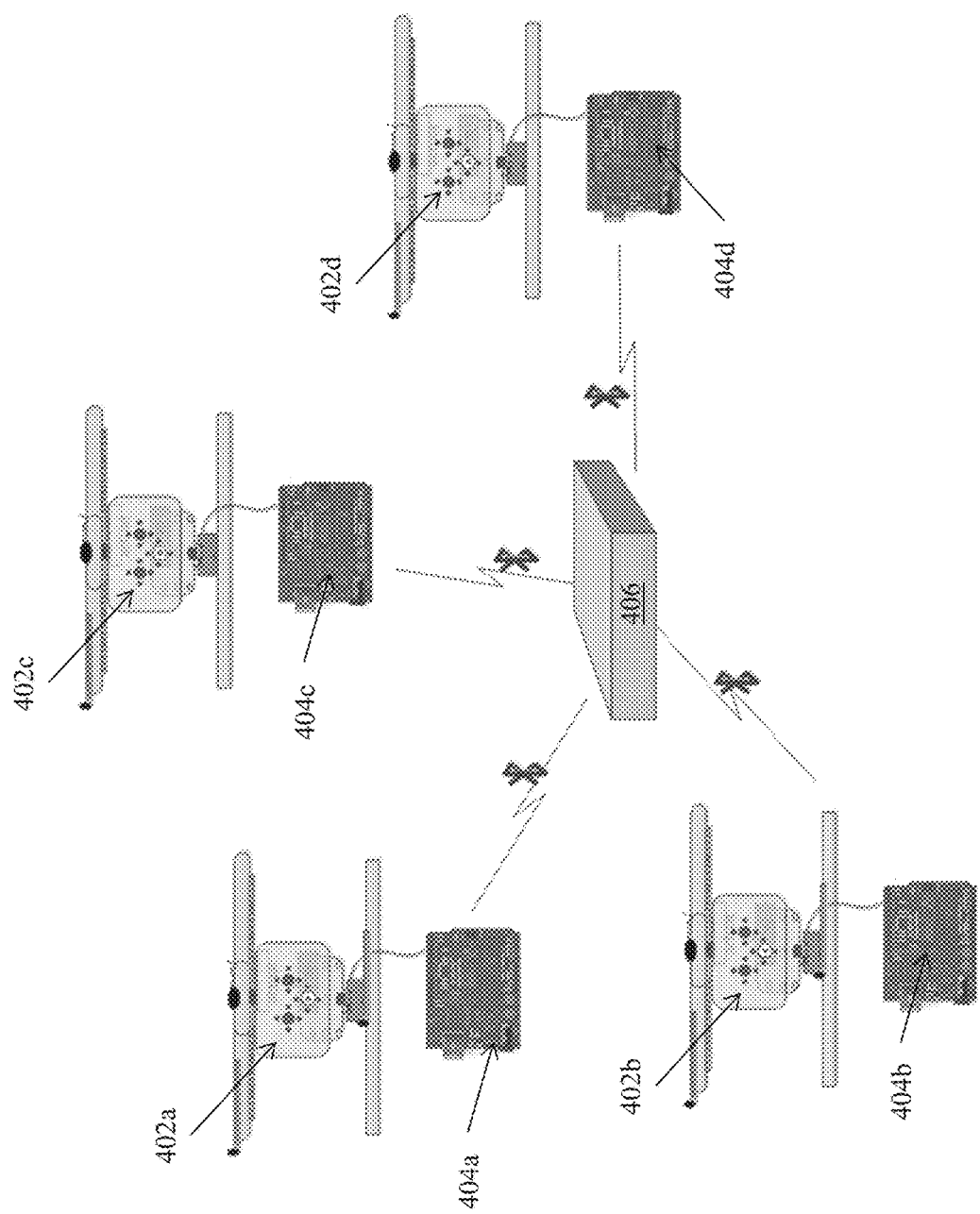
FIG. 4 is a diagram of a communications assembly for testing mobile devices using an intelligent mobile device test fixture.

FIG. 4 is a diagram of a communications assembly 400 for testing mobile devices using the intelligent mobile device test fixture 100 of FIG. 1. As shown in FIG. 4, the communications assembly 400 includes a plurality of intelligent mobile device test fixtures 402a-402d as described above with respect to FIG. 1, a plurality of controller boards 404a-404d, and a server computing device 406. The servo motors included in each fixture 402a-40d are connected to a controller board 404a-404d via one or more support harnesses. The controller boards 404a-404d each comprise circuitry including a microprocessor, input/output pins for coupling to the control wiring for the servo motors, and a wireless communications module (e.g., Bluetooth™) for connecting to the server computing device 406. The controller boards 404a-404d receive programmatic instructions from the server computing device 406 for operation of the servo motors in each fixture 402a-402d. For example, the server computing device 406 (e.g., a Mac® mini server available from Apple, Inc.) can provide instructions wirelessly via Bluetooth™ to each controller board 404a-404d where the instructions correspond to desired positions and/or orientations of the mobile device for a testing procedure (e.g., testing the operation of a gyroscope embedded in the mobile device to activate functionality of a mobile application). The controller boards 404a-404d can execute the instructions (using the microprocessor) to actuate the servo motors in each fixture 402a-402d and move the mobile device accordingly. An exemplary controller board that can be used in the apparatus is the Arduino BT microcontroller board available from Arduino (http://arduino.cc) with an XBee shield for communicating wirelessly with the server computing device 406.

It should be appreciated that the server computing device 406 can generate programmatic instructions to control both the controller boards 404a-404d (and correspondingly, the servo motors of the test fixtures 402a-402d) and applications executing on the mobile devices in the fixtures 402a-402d in order to perform a test procedure. For example, a developer or tester may author a test script (e.g., written in Java), which delineates a sequence of commands or operations to be performed in a test routine. The server computing device 406 translates the test script into a set of programmatic instructions to control the application and/or the test fixture in performing the test routine. In some embodiments, the programmatic instructions include a set of instructions for the application (e.g., written as an XML configuration file) and another set of instructions for the test fixture (e.g., written in C++).

The respective sets of instructions can be synchronized so that the application and the test fixture are coordinated to perform the operations of the test routine. For example, the individual instructions in each set of instructions can be associated with a timestamp or other form of temporal indicator so that the application and the controller boards execute the respective instructions at appropriate times to achieve synchronization.

Figure 5:
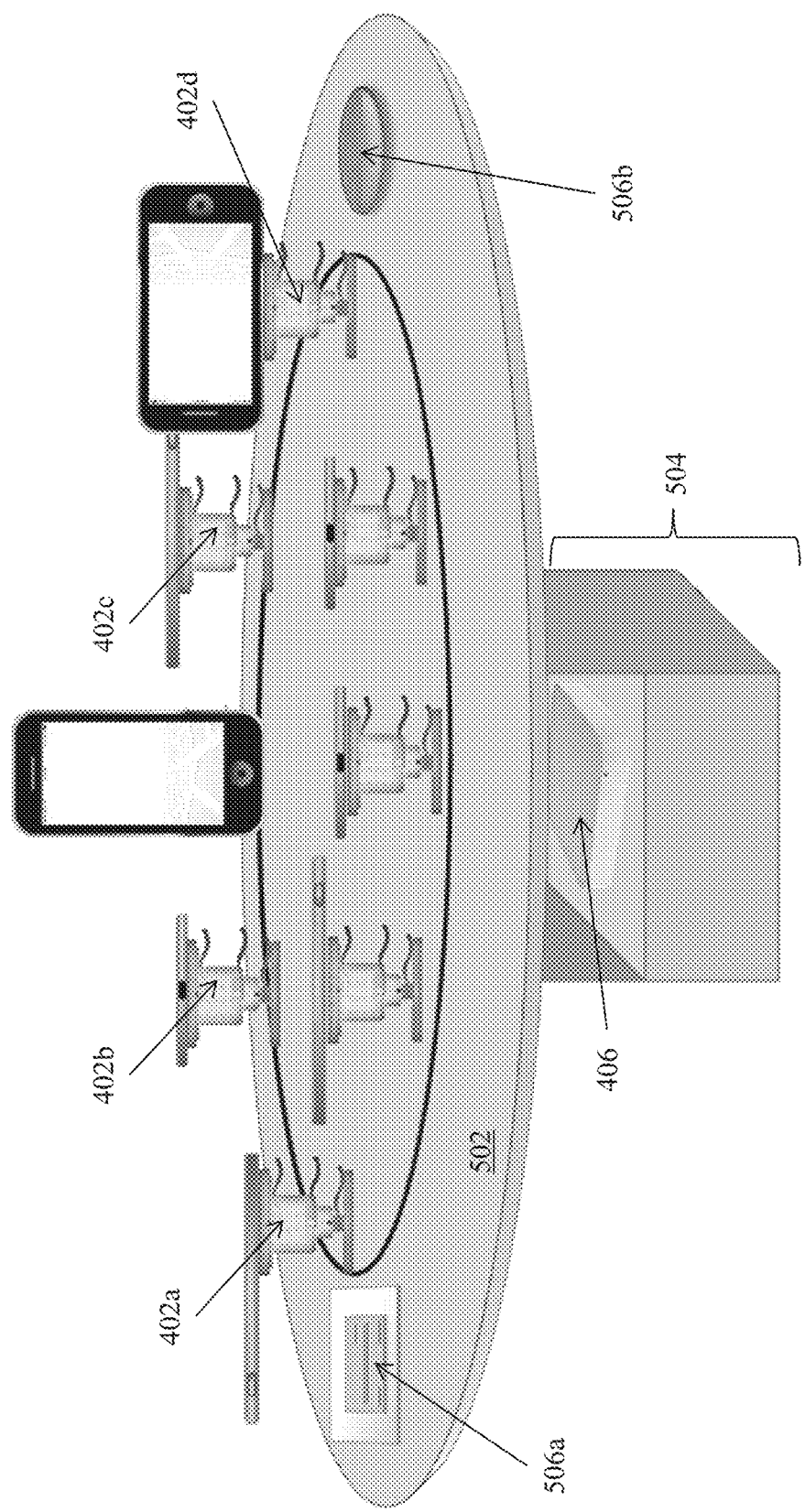
FIG. 5 is a diagram of a rotating table apparatus for testing mobile devices using an intelligent mobile device test fixture.

In some embodiments, the communications assembly 400 of FIG. 4 can be adapted for use in a rotating table apparatus, whereby each fixture 402a-402d is attached to a circular table in a predetermined position and the table rotates to move the fixtures 402a-402d between various testing stations, thereby further automating the testing process. FIG. 5 is a diagram of said rotating table apparatus 500. As shown in FIG. 5, the apparatus 500 includes a circular table 502, to which the plurality of intelligent mobile device test fixtures 402a-402d from the communications assembly 400 of FIG. 4 are attached at predetermined positions around the edge of the table 502, and the server computing device 406 is located in a compartment of a support structure 504 beneath the table 502. The table apparatus 500 further includes one or more testing stations (e.g., stations 506a, 506b) that can comprise a device or other apparatus used for testing the mobile devices in each fixture. For example, the stations 506a, 506b can include devices such as an image display apparatus, an audio playback/capture apparatus, a touch-screen interaction apparatus, and other types of devices or apparatuses that can be controlled and activated by the server computing device 406 to perform certain test procedures. In some embodiments, the server computing device 406 can generate another set of programmatic instructions based upon the above-referenced test script to control the stations 506a, 506b in synchronization with the application on the mobile devices and/or the test fixtures 402a-402d.

As many mobile applications utilize images from the camera as part of their functionality, the table apparatus 500 advantageously enables developers and testers to automate app testing using a variety of different images and mobile device orientations in rapid succession, increasing the speed and efficiency of the testing process instead of relying on a manual tester to swap between images and re-orient the mobile device each time. As shown in FIG. 5, the station 506a is an image display apparatus (e.g., a monitor or a tablet computer) that is operable to display images to be scanned or viewed using a camera embedded in the mobile device. For example, the table apparatus 500 can rotate such that a test fixture 402a is positioned in proximity to the station 506a. The server computing device 406 can transmit instructions to the controller board coupled to the fixture 402a to activate the servo motors of the fixture 402a and move the mobile device in position over the image display apparatus (e.g., move the mobile device laterally so that the embedded camera is able to view and/or capture an image displayed on the image display apparatus).

An exemplary image display apparatus comprises a thin film transistor (TFT) LCD display assembly, including a SainSmart MEGA2560 R3 development board coupled to a seven-inch TFT LCD screen (resolution: 800×480, aspect ratio: 15:9, color/transparent screen), with an SD card slot and a TFT shield. The image display apparatus station 506a is capable of communicating with the server computing device 406 (e.g., via wireless connection) to receive commands and images that approximate a wide variety of use conditions. For example, in testing a mobile barcode scanning app, the image display apparatus station 506a can receive many barcode images from the server computing device 406 for display to the mobile device, including barcode images that are incomplete, skewed, blurry, in different lighting conditions, and so forth to encompass many different environments in which the app may be used. Also, the test fixture 404a can be moved in conjunction with the display of images so as to determine whether the barcode can be read if the mobile device is in various orientations and positions with respect to the image display, thereby enabling developers to determine potential problem scenarios and build solutions to overcome them during the testing phase.

In addition, many mobile applications use the microphone and/or speaker embedded in a mobile device to capture audio and play back audio in the context of mobile application functionality. For example, a mobile app may allow a user to speak into the microphone and leverage voice recognition or speech-to-text functionality to enhance the usability of the application. As shown in FIG. 5, the station 506b is an audio capture/playback apparatus (e.g., a microphone/speaker) that is capable of capturing sounds emitted by a mobile device and of playing sounds for capture by the microphone embedded in a mobile device. For example, the table apparatus 500 can rotate such that a test fixture 402b is positioned in proximity to the station 506b. The server computing device 406 can transmit instructions to the controller board coupled to the fixture 402b to activate the servo motors of the fixture 402b and move the mobile device in position over the audio capture/playback apparatus (e.g., move the mobile device laterally and/or horizontally so that the embedded microphone is able to receive audio emitted by a speaker in the audio capture/playback apparatus).

An exemplary audio capture/playback apparatus comprises a voice playback controller apparatus including a micro controller (e.g., Anduino UNO or equivalent) with an MP3 trigger (e.g., WIG-11029 or WIG-13720) and command code logic for sequencing voice prompts and lookup. The voice playback controller assembly is coupled to a speaker assembly for producing audio that is then captured by the microphone of the mobile device.

In one embodiment, the audio file can comprise a voice command for operation of the application on the mobile device such that, when the audio file is played back by the audio capture/playback apparatus 406 and is captured by a microphone of the mobile device, the application receives the voice command and executes functionality of the application that is responsive to the voice command. For example, the audio file can comprise a voice command of "Buy one hundred shares of Apple stock." The microphone of the mobile device captures the voice command, and the application converts the voice command into text. Then, the application parses the text to extract actionable information and generate corresponding actions in the application—such as, e.g., automatically navigating to a trading page, filling in a user input field for quantity as "100," filling in a user input field for transaction as "Buy," and filling in a user input field for ticker symbol as "AAPL." Then, the application can, e.g., activate a "Preview" button in the user interface of the application which displays a preview page and enables the application to verify that the above-identified information is correct.

The audio capture/playback apparatus 506b is capable of communicating with the server computing device 406 (e.g., via wireless connection) to receive commands and audio files that approximate a wide variety of use conditions. For example, in testing an interactive voice response app, the audio capture/playback apparatus 506b can receive audio files of a variety of different voices from the server computing device 406 for playback to the mobile device, including audio files that are incomplete, noisy, quiet, choppy, and so forth to encompass many different environments in which the app may be used. Also, the test fixture 404b can be moved in conjunction with the playback of audio so as to determine whether the audio files can be detected by the microphone of the mobile device if the mobile device is in various orientations and positions with respect to the audio capture/playback apparatus 506b, thereby enabling developers to determine potential problem scenarios and build solutions to overcome them during the testing phase.

It should be appreciated that although FIG. 5 depicts an image display apparatus 506a and an audio capture/playback apparatus 506b, other types of testing apparatuses or devices can be used. Examples include devices (e.g., a stylus) operable to interact with a touchscreen of the mobile device, short-range frequency devices (e.g., near field communication (NFC)/radio frequency identification (RFID) tags) operable to communicate with corresponding circuitry of the mobile device, and biometric devices to simulate or approximate a user's fingerprint, retina, and so forth.

Figure 6:
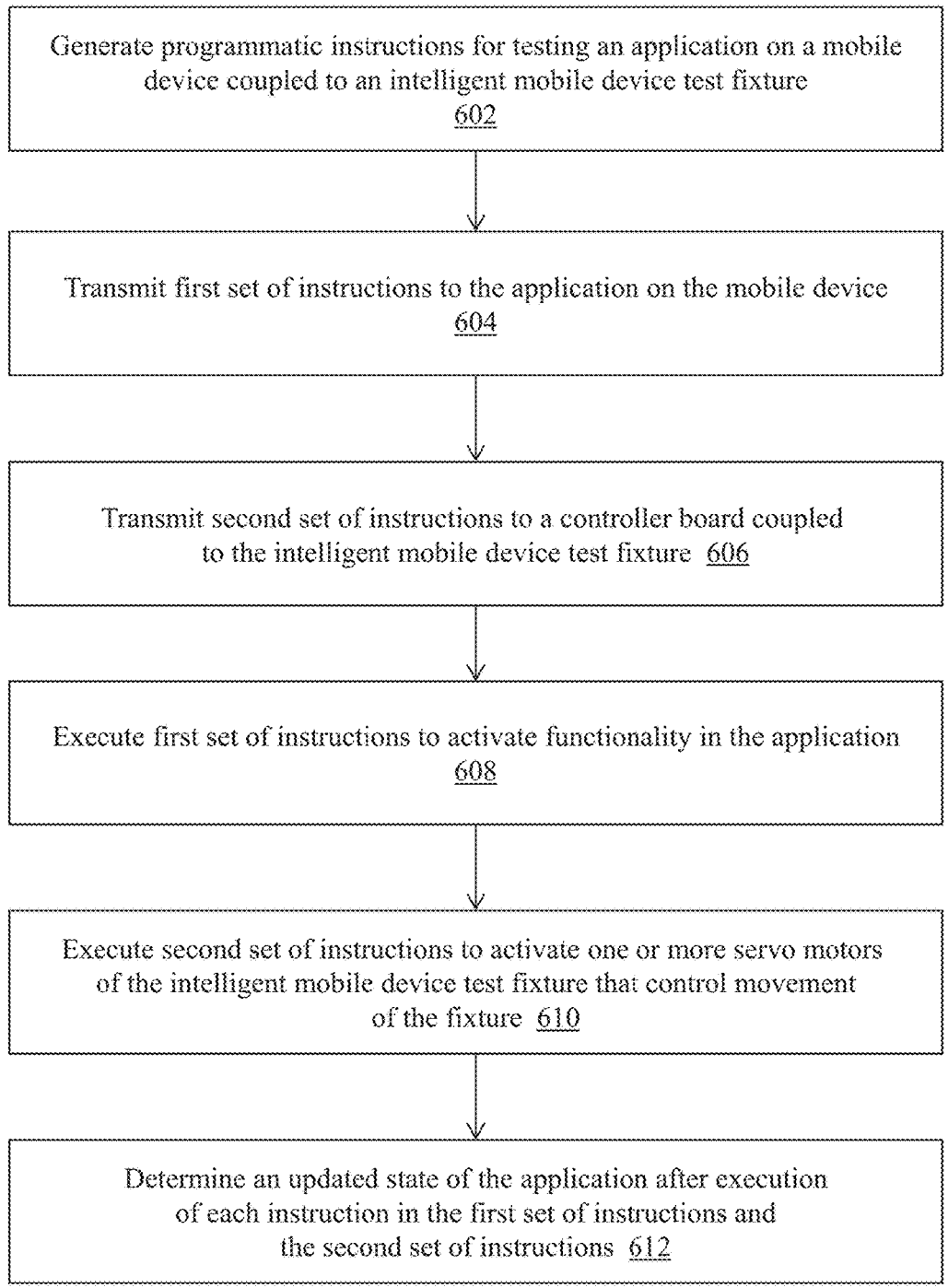
FIG. 6 is a flow diagram of a method for testing mobile devices using an intelligent mobile device test fixture and a communications assembly.

FIG. 6 is a flow diagram of a method 600 for testing mobile devices using the intelligent mobile device test fixture 100 of FIG. 1 and the communications assembly 400 of FIG. 4. The server computing device 406 generates (602) programmatic instructions for testing an application on a mobile device coupled to the intelligent mobile device test fixture 402a, where the programmatic instructions are based upon a test script, and include a first set of instructions for performing functionality of the application and a second set of instructions for controlling the intelligent mobile device test fixture 402a. The server computing device 406 transmits (604) the first set of instructions to the application on the mobile device, and transmits (606) the second set of instructions to a controller board 404a coupled to the intelligent mobile test device fixture 402a.

The application (608) executes the first set of instructions to activate functionality in the application. The application can execute the first set of instructions to activate functionality such as manipulation of user interface elements in the application, entry of data into the application, and so forth. One aspect of functionality that the application can activate is mimicking user operation of the mobile device by, e.g., simulating touchscreen operations. For example, an instruction in the first set of instructions can be to provide input simulating a touch of the screen at certain x-y coordinates. The application can execute this instruction and activate the input at the specified coordinates, which results in interaction with the user interface displayed on the screen.

The controller board 404a (608) executes the second set of instructions to activate one or more servo motors of the intelligent mobile device test fixture 402a that control movement of the fixture. For example, an instruction in the second set of instructions can be to rotate the mobile device to change the orientation of its screen (e.g., from portrait to landscape). The controller board 404a can execute this instruction to cause the servo motors to rotate the text fixture 402a in a manner that results in, e.g., a gyroscope of the mobile device triggering the display screen of the mobile device to change its orientation.

The server computing device 406 determines (610) an updated state of the application based upon execution of the first set of instructions and the second set of instructions. For example, after execution of each instruction in the first set of instructions and the second set of instructions, the server computing device can receive a current state of the application from the mobile device—which may be comprised of a plurality of data elements relating to the application (e.g., workflow state, screen state, input state, mobile device orientation, and the like). The server computing device 406 compares the current state as received from the application with the prior state of the application that was received from the application after execution of the preceding instruction and determines how the state has changed. In some embodiments, the server computing device 406 can further compare the current state of the application with an expected state of the application to determine whether any errors have occurred in the application as a result of the testing procedure. In some embodiments, the server computing device 406 is network addressable, allowing for remote users to operate the intelligent mobile device test fixture from remote locations. Similar to the core instruction set on both the server computing device 406 and intelligent mobile device test fixture, multiple server computing units can be combined to allow parallel testing activities in an orchestrated manner dictated by the test scripts and intelligent mobile test fixture combinations.

Figure 7:
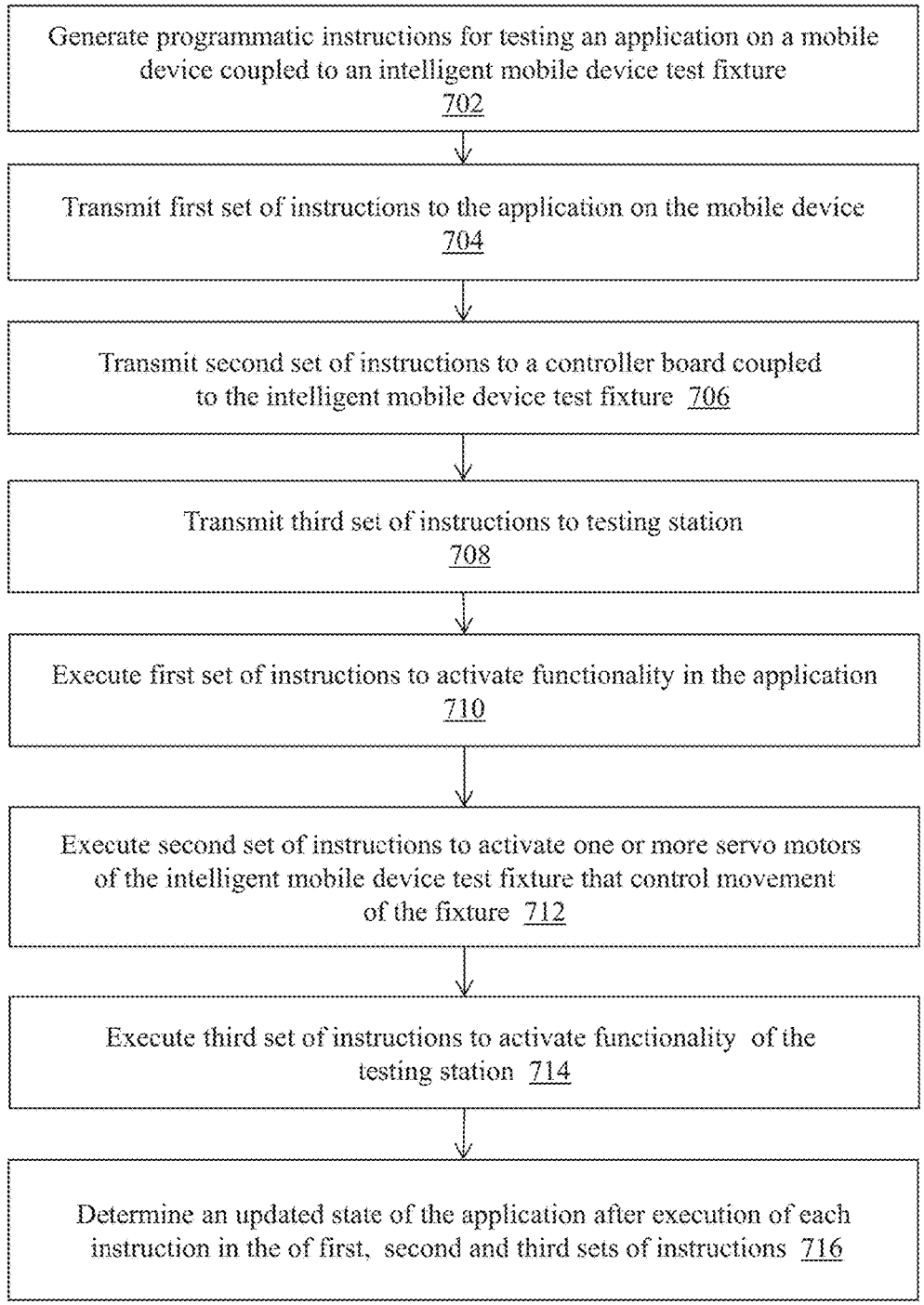
FIG. 7 is a flow diagram of a method for testing mobile devices using an intelligent mobile device test fixture and a table apparatus.

FIG. 7 is a flow diagram of a method 700 for testing mobile devices using the intelligent mobile device test fixture 100 of FIG. 1 and the table apparatus 500 of FIG. 5. The server computing device 406 generates (702) programmatic instructions for testing an application on a mobile device coupled to the intelligent mobile device test fixture 402a, where the programmatic instructions are based upon a test script, and include a first set of instructions for performing functionality of the application, a second set of instructions for controlling the intelligent mobile device test fixture 402a, and a third set of instructions for controlling a testing station 506a. The server computing device 406 transmits (704) the first set of instructions to the application on the mobile device, transmits (706) the second set of instructions to a controller board 404a coupled to the intelligent mobile device test fixture 402a, and transmits (708) the third set of instructions to the testing station 506a. The application (710) executes the first set of instructions to activate functionality in the application. The controller board 404a (712) executes the second set of instructions to activate one or more servo motors of the intelligent mobile device test fixture 402a that control movement of the fixture. The testing station 506a executes (714) the third set of instructions to activate functionality of the testing station 506a that provides biometric, sensory, and/or physical input to the mobile device. The server computing device determines (716) an updated state of the application after execution of each instruction in the first set of instructions, the second set of instructions, and the third set of instructions.

It should be appreciated that although the above techniques are described in the context of testing an application on a mobile device, the same techniques are applicable to a wide variety of devices and applications without departing from the scope of invention. For example, the intelligent mobile device test fixture described herein can be used to test other types of devices, e.g., Internet-of-Things (IoT) devices, smart appliances, wearable devices, and so forth. As one example, any device that includes voice-activated functionality (e.g., smart watches, smart TV devices) can be tested using the methods and systems described herein.

The above-described systems and methods can be implemented in digital electronic circuitry, in computer hardware, firmware, and/or software. The implementation can be as a computer program product (i.e., a computer program tangibly embodied in a computer readable storage medium). The implementation can, for example, be in a machine-readable storage device and/or include a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array), an ASIC (application-specific integrated circuit), a DSP (digital signal processor), and/or any other discrete circuitry that is configured to implement the required functions. Modules, subroutines, and software agents can refer to portions of the computer program, the processor, the special circuitry, software, and/or hardware that implements that functionality.

Processors suitable for the execution of a computer program include, by way of example, special purpose microprocessors specifically programmed with instructions to carry out the methods described herein. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Computer readable mediums suitable for embodying computer program instructions and data include all forms of non-volatile memory, including by way of example semiconductor memory devices. The computer readable mediums can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device or a transmitting device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The remote/client device and the computing device can include, for example, a computer, a computer with a browser device, a telephone, an IP phone, a mobile device (e.g., cellular phone, personal digital assistant (PDA) device, smart phone, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry® or iPhone®.

The web servers can be, for example, a computer with a server module (e.g., Microsoft® Internet Information Services available from Microsoft Corporation, Apache Web Server available from Apache Software Foundation, Apache Tomcat Web Server available from Apache Software Foundation).

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

The above described communication networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

The invention claimed is:

1. A computerized method for testing mobile devices using an intelligent mobile device test fixture, the method comprising:
generating, by a server computing device, programmatic instructions for testing an application on a mobile device held within an intelligent mobile device test fixture, wherein the programmatic instructions are based upon a test script and include a first set of instructions for performing functionality of the application and a second set of instructions for controlling the intelligent mobile device test fixture, the first set of instructions and the second set of instructions arranged for coordinated execution, and
wherein the intelligent mobile device test fixture comprises a platform with a plurality of expanding tracks connected at the center of the platform, each expanding track including arms that move in different directions along the track;
transmitting, by the server computing device, the first set of instructions to the application on the mobile device;
transmitting, by the server computing device, the second set of instructions to a controller board coupled to the intelligent mobile device test fixture;
executing, by the application, the first set of instructions to activate functionality in the application;
executing, by the controller board, the second set of instructions to activate one or more servo motors of the intelligent mobile device test fixture that control movement of the fixture, the one or more servo motors operating to rotate the platform of the intelligent mobile device test fixture; and
determining, by the server computing device, an updated state of the application after execution of each instruction in the first set of instructions and the second set of instructions.

2. The method of claim 1, wherein the execution of the first set of instructions by the application is synchronized with the execution of the second set of instructions by the controller board.

3. The method of claim 1, wherein each arm includes a tab at the end of the arm, the tab being used to secure the mobile device.

4. The method of claim 1, wherein one or more linear actuators are coupled to the platform, the actuators operable to slide the platform laterally in either direction.

5. The method of claim 1, wherein the intelligent mobile test fixture comprises an audio playback apparatus including a speaker.

6. The method of claim 5, wherein the second set of instructions includes an instruction that, when executed by the controller board, activates playback of an audio file on the speaker of the audio playback apparatus.

7. The method of claim 6, wherein the first set of instructions includes an instruction that, when executed by the application, activates a microphone of the mobile device to capture the playback of the audio file from the speaker.

8. The method of claim 1, wherein the intelligent mobile test fixture comprises a display screen.

9. The method of claim 8, wherein the second set of instructions includes an instruction that, when executed by the controller board, activates display of a digital image on the display screen.

10. The method of claim 9, wherein the first set of instructions includes an instruction that, when executed by the application, activates an image capture apparatus of the mobile device to capture an image of the display screen.

11. The method of claim 1, wherein the server computing device translates the test script into the programmatic instructions.

12. The method of claim 1, wherein the first set of instructions is written in a first programming language and the second set of instructions is written in a second programming language.

13. A system for testing mobile devices using an intelligent mobile device test fixture, the system comprising a server computing device coupled to the intelligent mobile device test fixture, the server computing device configured to:

generate programmatic instructions for testing an application on a mobile device coupled to an intelligent mobile device test fixture, wherein the programmatic instructions are based upon a test script, and include a first set of instructions for performing functionality of the application and a second set of instructions for controlling the intelligent mobile device test fixture, the first set of instructions and the second set of instructions arranged for coordinated execution, and wherein the intelligent mobile device test fixture comprises a platform with a plurality of expanding tracks connected at the center of the platform, each expanding track including arms that move in different directions along the track;

transmit the first set of instructions to the application on the mobile device;

transmit the second set of instructions to a controller board coupled to the intelligent mobile device test fixture;

wherein the application is configured to execute the first set of instructions to activate functionality in the application;

wherein the controller board is configured to execute the second set of instructions to activate one or more servo motors of the intelligent mobile device test fixture that control movement of the fixture, the one or more servo motors operating to rotate the platform of the intelligent mobile device test fixture; and wherein the server computing device is configured to determine an updated state of the application after execution of each instruction in the first set of instructions and the second set of instructions.

14. The system of claim 13, wherein the execution of the first set of instructions by the application is synchronized with the execution of the second set of instructions by the controller board.

15. The system of claim 13, wherein each arm includes a tab at the end of the arm, the tab being used to secure the mobile device.

16. The system of claim 13, wherein one or more linear actuators are coupled to the platform, the actuators operable to slide the platform laterally in either direction.

17. The system of claim 13, wherein the intelligent mobile test fixture comprises an audio playback apparatus including a speaker.

18. The system of claim 17, wherein the second set of instructions includes an instruction that, when executed by the controller board, activates playback of an audio file on the speaker of the audio playback apparatus.

19. The system of claim 18, wherein the first set of instructions includes an instruction that, when executed by the application, activates a microphone of the mobile device to capture the playback of the audio file from the speaker.

20. The system of claim 13, wherein the intelligent mobile test fixture comprises a display screen.

21. The system of claim 20, wherein the second set of instructions includes an instruction that, when executed by the controller board, activates display of a digital image on the display screen.

22. The system of claim 21, wherein the first set of instructions includes an instruction that, when executed by the application, activates an image capture apparatus of the mobile device to capture an image of the display screen.

23. The system of claim 13, wherein the server computing device translates the test script into the programmatic instructions.

24. The system of claim 13, wherein the first set of instructions is written in a first programming language and the second set of instructions is written in a second programming language.

25. A computer program product, tangibly embodied in a non-transitory computer readable storage medium, for testing mobile devices using an intelligent mobile device test fixture, the computer program product including instructions operable to cause a server computing device coupled to the intelligent mobile device test fixture to:

generate programmatic instructions for testing an application on a mobile device coupled to an intelligent mobile device test fixture, wherein the programmatic instructions are based upon a test script, and include a first set of instructions for performing functionality of the application and a second set of instructions for controlling the intelligent mobile device test fixture, the first set of instructions and the second set of instructions arranged for coordinated execution, and wherein the intelligent mobile device test fixture comprises a platform with a plurality of expanding tracks connected at the center of the platform, each expanding track including arms that move in different directions along the track;

transmit the first set of instructions to the application on the mobile device;

transmit the second set of instructions to a controller board coupled to the intelligent mobile device test fixture;

wherein the application is configured to execute the first set of instructions to activate functionality in the application;

wherein the controller board is configured to execute the second set of instructions to activate one or more servo motors of the intelligent mobile device test fixture that control movement of the fixture, the one or more servo motors operating to rotate the platform of the intelligent mobile device test fixture; and wherein the server computing device is configured to determine an updated state of the application after execution of each instruction in the first set of instructions and the second set of instructions.

* * * * *